United States Patent [19]

Carey et al.

[11] Patent Number: 5,052,533
[45] Date of Patent: Oct. 1, 1991

[54] ONE-WAY CLUTCH ENERGIZING SPRING

[75] Inventors: James R. Carey, Downers Grove; Frank J. Ferfecki, Riverside, both of Ill.

[73] Assignee: Borg-Warner Corporation, Chicago, Ill.

[21] Appl. No.: 12,591

[22] Filed: Feb. 9, 1987
(Under 37 CFR 1.47)

[51] Int. Cl.⁵ .............................................. F16D 41/07
[52] U.S. Cl. .................................. 192/41 A; 192/45.1
[58] Field of Search ........................... 192/41 A, 45.1; 188/82.8

[56] References Cited

U.S. PATENT DOCUMENTS

| | | | |
|---|---|---|---|
| 2,683,510 | 7/1954 | Troendly | 192/45.1 |
| 2,744,598 | 5/1956 | Troendly | 192/45.1 |
| 2,750,019 | 6/1956 | Ferris | 192/45.1 |
| 2,753,027 | 7/1956 | Troendly et al. | 192/45.1 |
| 2,824,635 | 2/1958 | Troendly et al. | 192/45.1 |
| 2,824,636 | 2/1958 | Troendly et al. | 192/45.1 |
| 2,940,567 | 6/1960 | Dodge | 192/45.1 |
| 3,219,163 | 11/1965 | Zlotek | 192/45.1 |
| 4,114,739 | 9/1978 | Colonna et al. | 192/41 A |

Primary Examiner—Richard Lorence
Attorney, Agent, or Firm—James A. Geppert; Greg Dziegielewski

[57] ABSTRACT

An energizing spring utilized for a one-way clutch; such as a sprag clutch, wherein the spring includes a resilient high tensile spring steel metal cage or ring having parallel side bars joined by cross bars to define a plurality of openings with tapered inwardly extending tabs, both the tabs and the side bars having transverse wrinkles or depressions therein. This energizing spring cooperates with a set of generally rigid inner and outer circular cages between the inner and outer races, these cages having openings corresponding to the spring openings to receive sprags which engage the inner and outer races.

9 Claims, 2 Drawing Sheets

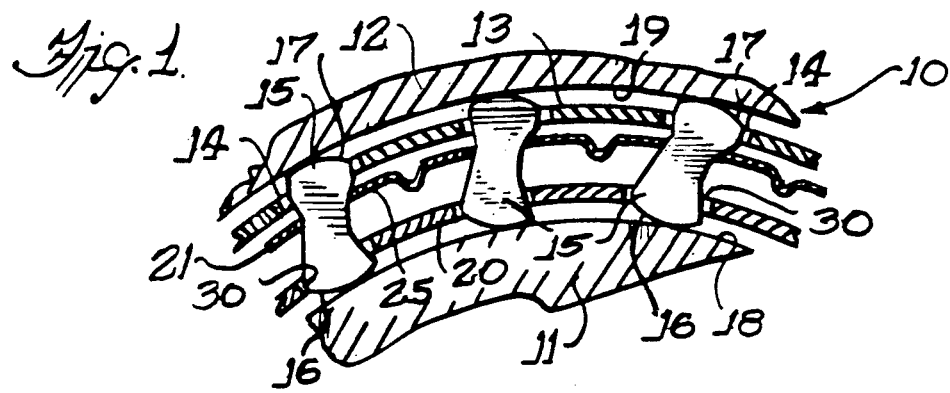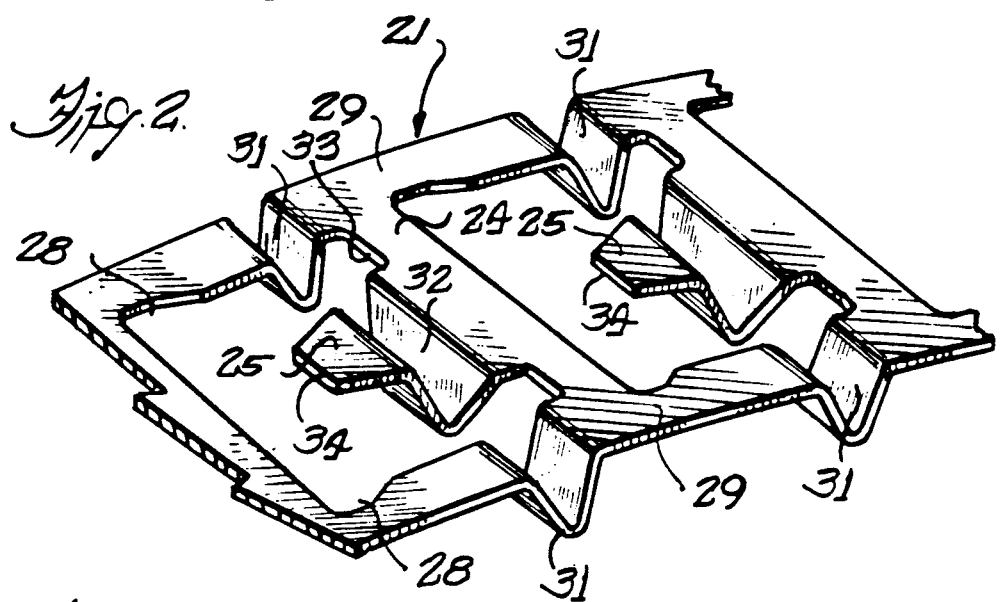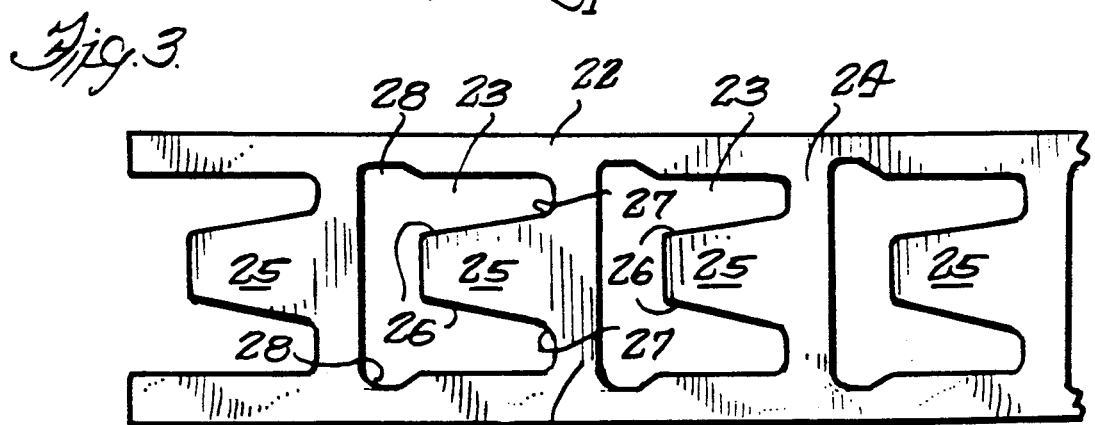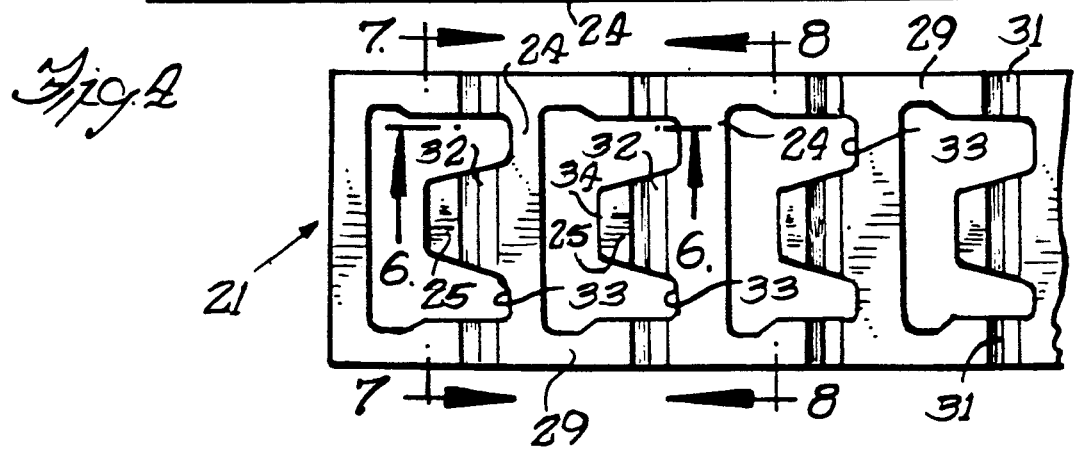

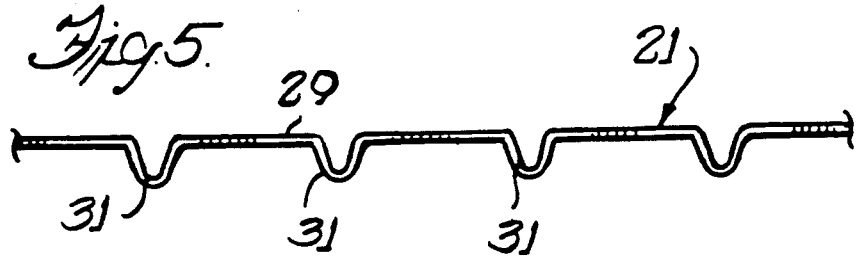
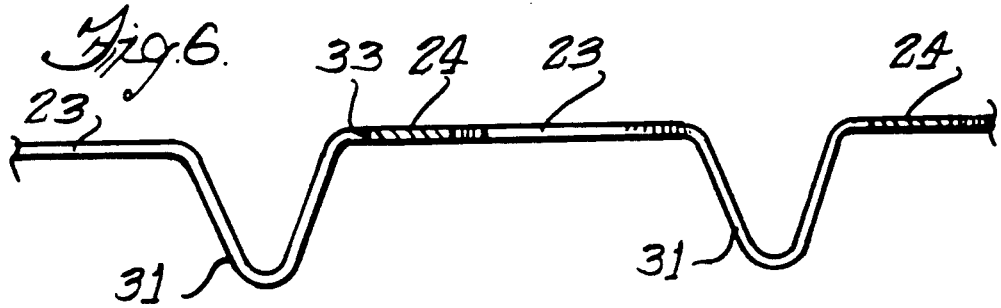
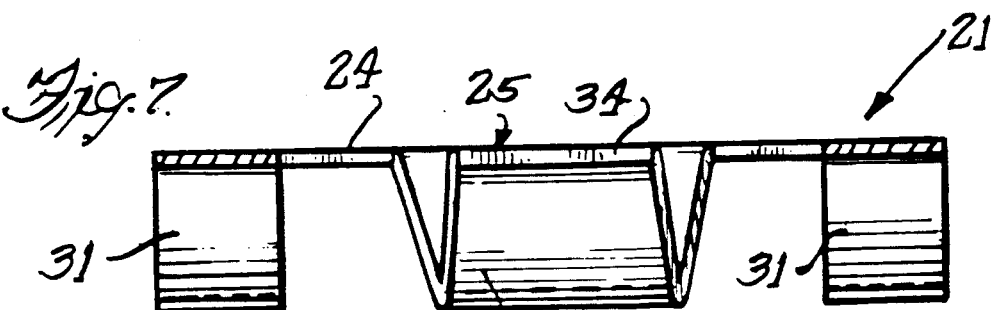
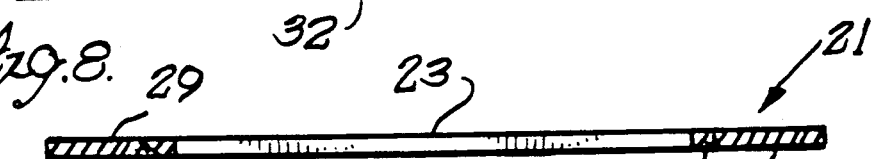
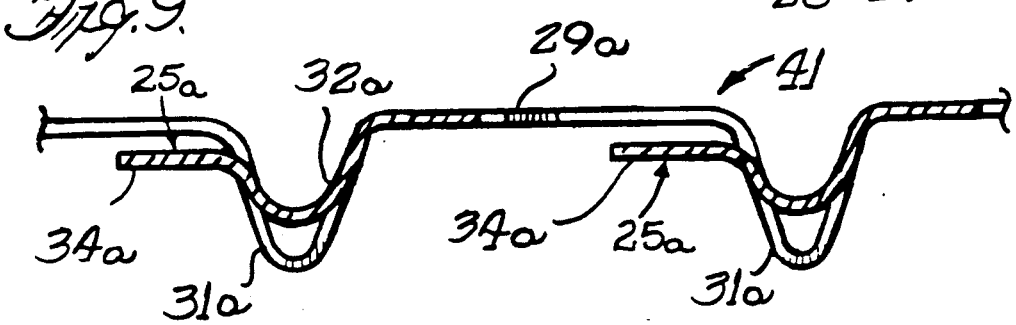

5,052,533

ONE-WAY CLUTCH ENERGIZING SPRING

BACKGROUND OF THE INVENTION

The present invention relates to an improved energizing spring for a one-way sprag clutch. In many conventional one-way clutch assemblies, a circular cage and a circular energizing spring are positioned radially midway between the inner and outer concentric races for a sprag clutch. The sprags are positioned in aligned openings in the cage and spring and are tiltable into wedging engagement with the races. Extending into each opening in the spring is an energizing tab which engages the associated sprag to urge the sprag into wedging engagement with the races.

One such energizing spring is shown in the Troendly et al U.S. Pat. No. 2,573,027. In this patent, a circular energizing spring consists of a pair of parallel sides joined by a plurality of circumferentially spaced cross pieces defining spaced openings receiving the clutch sprags. Adjacent each cross piece, a transverse wrinkle or depression is formed in each parallel side. Extending from one edge of each cross piece is a substantially rectangular tab also having a transverse wrinkle or depression closely adjacent the cross piece. A circular, generally rigid cage is also located between the races contacting the spring and having transverse depressions which engage either the inner or outer race surface to position the cage in the clutch assembly.

In the Troendly et al U.S. Pat. No. 2,824,635, another one-way sprag clutch is disclosed, which is similar in construction to the previous patent, including a resilient cage 21 having spaced openings 23 separated by cross pieces 24 and sprag energizing tabs 25; a transverse wrinkle 27 at each side of the cage 21 and an aligned wrinkle 28 in each tab 25 adjacent the cross piece 24. FIGS. 4 through 13 disclose alternate versions of the resilient cage.

The present invention overcomes stress problems and breakage of the sprag energizing tabs that has occurred in the energizing springs of prior devices.

SUMMARY OF THE INVENTION

The present invention relates to an improved energizing spring for a one-way sprag clutch wherein a resilient high tensile metal energizing spring band is utilized in conjunction with generally rigid inner and outer sprag cages positioned intermediate the inner and outer races for the clutch. Both the energizing spring and the cages include a plurality of generally aligned, circumferentially spaced openings receiving individual sprags. Each opening in the energizing spring also has a tapered energizing tab resiliently engaging the associated sprag with a transverse wrinkle formed therein spaced from the cross bar to which the tab is attached.

Further objects are to provide a construction of maximum simplicity, efficiency, economy and ease of assembly, and such further objects, advantages and capabilities as will later more fully appear and are inherently possessed thereby.

DESCRIPTION OF THE DRAWINGS

FIG. 1 is a partial side elevational view of a sprag clutch utilizing the improved energizing spring.

FIG. 2 is an enlarged partial perspective view of the energizing spring.

FIG. 3 is a partial top plan view of the stamped spring blank.

FIG. 4 is a partial top plan view of the formed spring prior to being formed into a circle.

FIG. 5 is an edge view of a portion of the formed spring of FIG. 4.

FIG. 6 is an enlarged cross sectional view taken on the line 6—6 of FIG. 4.

FIG. 7 is an enlarged cross sectional view taken on the line 7—7 of FIG. 4.

FIG. 8 is an enlarged cross sectional view taken on the line 8—8 of FIG. 4.

FIG. 9 is a further enlarged cross sectional view similar to FIG. 6 through an alternate embodiment of the formed spring.

DESCRIPTION OF THE PREFERRED EMBODIMENTS

Referring more particularly to the disclosure in the drawings wherein are shown illustrative embodiments of the present invention, FIG. 1 discloses a one-way sprag clutch assembly 10 including a cylindrical inner race 11, a cylindrical outer race 12, and a generally rigid outer circular cage 13 provided with a plurality of circumferentially spaced openings 14 receiving individual sprags 15 having inner and outer rounded surfaces 16 and 17, respectively, engaging the cylindrical surfaces 18 and 19 of the races 11 and 12. A generally rigid inner cage 20 is positioned between an energizing spring and the inner race 11; the cage having openings 30 receiving the sprags.

The rigid cages 13 and 20 are both generally circular and formed by stamping with no overlapping ends. Circumferentially spaced transversely extending corrugations (not shown) may be formed into either cage to contact either the surface 18 or 19 and aid in positioning the cages relative to the inner and outer races. Positioned between the rigid cages is a generally circular energizing spring 21 which is formed from a flat metal strip 22 of spring steel having spaced openings 23 punched out of the strip, as seen in FIG. 3. Each opening is generally rectangular and separated by a cross bar 24 from the next adjacent opening. Projecting inward from each cross bar is an integral tapered energizing tab 25 having side edges 26,26 converging from the cross bar and provided with a rounded surface or fillet radius 27 at the intersection with the cross bar 24. Also, the opening 23 opposite the energizing tab is provided with a pair of enlarged corners 28.

After the strip 22 is formed and the openings 23 punched out, a wrinkle 31 is formed in each parallel side bar 29 and an aligned wrinkle 32 is formed in the energizing tab 25; the wrinkles 31 and 32 being spaced from the edge 33 of the cross bar 24. As seen in FIG. 7, the wrinkles 31 and 32 are of an equal depth and enhance the resiliency of the spring and energizing tabs. Lastly, the spring strip is formed into a generally circular configuration with over-lapping ends (not shown) and located adjacent the outer cage 13. The sprags 15 are positioned within the aligned openings 14, 30 and 23 of the cages and spring, respectively, with the free end 34 of each energizing tab 25 engaging a side of a corresponding sprag 15 to urge the sprag to rotate in a counter-clockwise direction to an engaged position with the inner and outer races of the clutch.

FIG. 9 discloses an alternate embodiment of energizing spring 41 which is substantially identical in configuration with the spring 21 of FIGS. 1 through 8, except the wrinkles 31a in the side bars 29a are deeper than the wrinkle 32a in the energizing tab 25a. The load on the sprag is adjusted by the height of the tab end 34a; the load also being increased by using thicker material or a more rigid tab. The usage of thicker material and a rigid tapered tab allows the height of the tab to be formed lower in relation to the plane of the side bar, as seen in FIG. 9. As a result of being formed lower, the tab deflection is less at freewheel and the life of the spring is increased.

The tapered tab of this invention transfers more of its load to the crossbars than the previously used parallel sided tab. The crossbar width is also thinner to act as a spring and absorb the increased load without fracturing. The fillet radius at the tab base is also increased in this invention to reduce the loading at this point. These changes have greatly enhanced the fatigue life of the ribbon spring in a sprag one-way clutch.

We claim:

1. An energizing spring for a one-way sprag clutch having at least one relatively rigid cage between inner and outer clutch races, comprising an elongated resilient metal ribbon bent into a circular spring, said ribbon including a plurality of longitudinally spaced openings in the ribbon separated by a plurality of cross bars, a pair of side bars defined by said openings and joined by said cross bars, and a plurality of tapered energizing tabs, each cross bar having a tab extending from one edge thereof into an opening, each said tab having opposite edges converging from said cross bar to terminate within said opening, each of said side bars and said energizing tab being formed with a transverse wrinkle spaced from said cross bar.

2. An energizing spring as set forth in claim 1, wherein all of the wrinkles are formed to have an equal depth.

3. An energizing spring as set forth in claim 1, wherein the wrinkles in the side bar have a greater depth than the wrinkle in said energizing tab.

4. An energizing spring as set forth in claim 1, wherein each opening has enlarged corners at the edge of the cross bar opposite to the energizing tab.

5. An energizing spring as set forth in claim 1, in which the corners of the intersection of said tab with said cross bar are rounded.

6. A one-way sprag clutch including at least one relatively rigid cage between inner and outer clutch races, and a plurality of sprags positioned in said cage, the improvement comprising an elongated resilient metal ribbon bent into a circular spring, said ribbon including a plurality of longitudinally spaced openings in the ribbon flanked by a pair of side bars and separated by a plurality of cross bars, and a plurality of tapered energizing tabs, each cross bar having a tab extending from one edge thereof into an opening, each said tab having opposite edges converging from said cross bar to terminate within said opening, each of said side bars and said energizing tab being formed with a transverse wrinkle spaced from said cross bar.

7. A one-way sprag clutch as set forth in claim 6, wherein said wrinkles in the tab and cross bars have an equal depth.

8. A one-way sprag clutch as set forth in claim 6 wherein the wrinkles in the parallel side bars have a greater depth than the wrinkle in the energizing tab.

9. A one-way sprag clutch as set forth in claim 8, in which the free end of said tab is located below the plane of said side bars and cross bar.

* * * * *